(12) United States Patent
Bigham

(10) Patent No.: US 8,776,825 B1
(45) Date of Patent: Jul. 15, 2014

(54) FLUID DRAIN CART

(71) Applicant: Lloyd G. Bigham, Northport, AL (US)

(72) Inventor: Lloyd G. Bigham, Northport, AL (US)

( * ) Notice: Subject to any disclaimer, the term of this patent is extended or adjusted under 35 U.S.C. 154(b) by 35 days.

(21) Appl. No.: 13/755,739

(22) Filed: Jan. 31, 2013

Related U.S. Application Data

(60) Provisional application No. 61/592,888, filed on Jan. 31, 2012.

(51) Int. Cl.
*D06F 39/08* (2006.01)

(52) U.S. Cl.
USPC .................. 137/312; 220/573; 280/47.34

(58) Field of Classification Search
USPC ............... 137/312; 220/573; 280/32.6, 43.19, 280/47.34, 79.11, 79.2
See application file for complete search history.

(56) References Cited

U.S. PATENT DOCUMENTS

| | | | |
|---|---|---|---|
| 4,274,645 A | 6/1981 | Ferguson et al. | |
| 4,485,853 A | 12/1984 | Gunderson | |
| 4,638,841 A | 1/1987 | Heath | |
| 5,062,500 A | 11/1991 | Miller et al. | |
| 5,092,457 A | 3/1992 | Islava et al. | |
| 5,121,776 A | 6/1992 | Kovach | |
| 5,172,739 A | 12/1992 | Ristroph | |
| 5,301,724 A | 4/1994 | Maxwell | |
| 5,320,145 A | 6/1994 | Avino | |
| 5,375,862 A | 12/1994 | Sirianno | |
| 5,432,954 A | 7/1995 | Taylor | |
| 5,620,018 A * | 4/1997 | Carpenter et al. | 137/312 |
| 5,803,140 A | 9/1998 | Jodoin | |
| 5,852,961 A | 12/1998 | Kotowski | |
| 5,921,292 A | 7/1999 | Fouts | |
| 5,988,427 A * | 11/1999 | Moore | 220/571 |

* cited by examiner

*Primary Examiner* — Eric Keasel
*Assistant Examiner* — Reinaldo Sanchez-Medina
(74) *Attorney, Agent, or Firm* — Robert C. Montgomery; Montgomery Patent & Design

(57) ABSTRACT

An oil removing apparatus and system designed to drain fluids such as hot motor oil from a motor vehicle comprises a tank supported by rolling casters and having handles used to position the tank underneath a motor vehicle. An upper portion of the apparatus comprises an inflatable wall structure which provides vertically adjustable positioning around an oil pan or similar structure. The inflatable structure further includes a heat-resistant glove for accessing and removing a drain plug or similar feature. During typical use, a user removes the drain plug with the glove and drains the oil while the glove and inflatable structure protects the user from the hot motor oil.

20 Claims, 4 Drawing Sheets

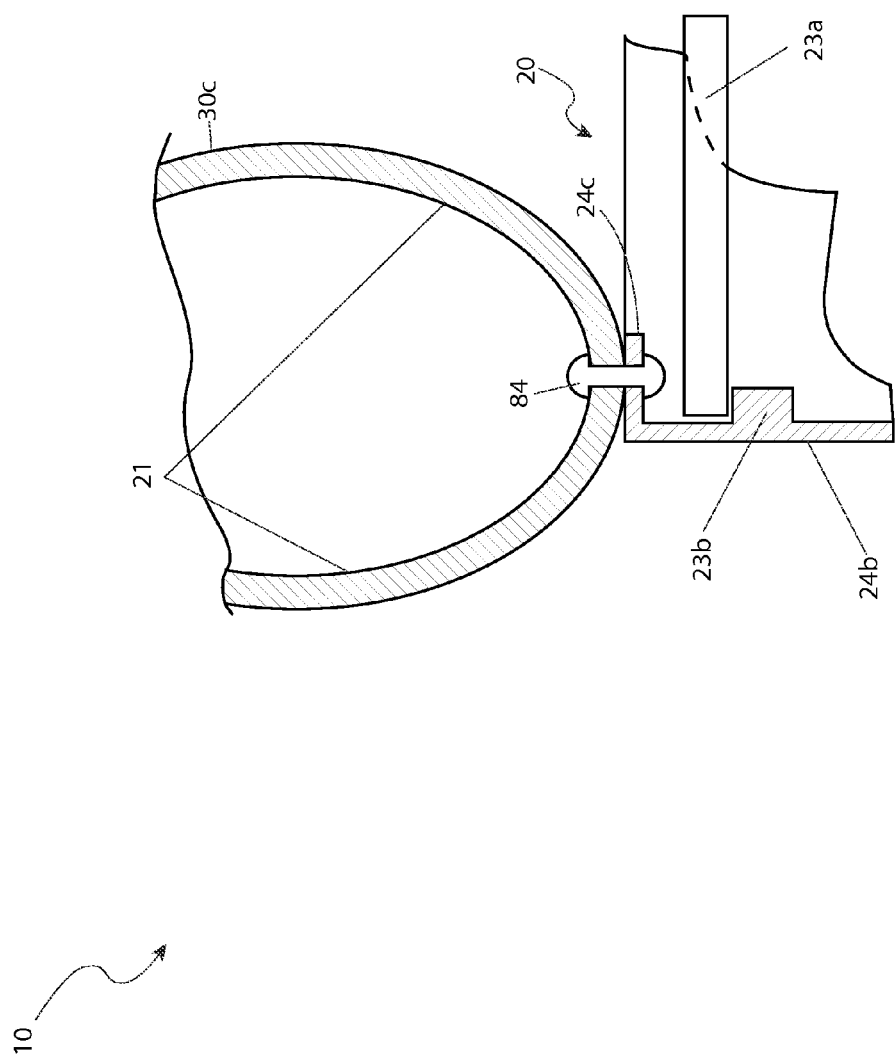

FLUID DRAIN CART

RELATED APPLICATIONS

The present invention was first described in U.S. Patent Provisional No. 61/592,888 filed on Jan. 31, 2012 the entire disclosures of which are incorporated herein by reference.

FIELD OF THE INVENTION

The present invention relates to a fluid receiving chamber and more specifically, to a mobile cart having an inflatable structure with at least one (1) glove port to enable a user to drain a vehicle of a fluid and subsequent collection and filtration of the fluid.

BACKGROUND OF THE INVENTION

The routine maintenance of vehicles, and other machines employing internal combustion engines, generally requires the removal and replacement of lubricating fluids housed within the engine. In order to remove such fluids, it is necessary to have a device to adequately collect and temporarily stow the drained fluid in a convenient manner. Additionally, environmental consciousness dictates the proper storage, recycling, and disposal of such fluids. Problems often encountered by individuals performing such maintenance include unwieldy collection apparatuses used for larger vehicles, coming into physical contact with the drained fluids, being exposed to the risk of scolding due to the elevated temperatures of the drained fluids, inadequate collection and storage of the fluids for environmental purposes, and insufficient containment of the draining fluids so as to prevent splashing and spillage. It would be of great benefit to mechanics and the like to have a drainage and collection system that solves the above-mentioned problems, while satisfying the needs of convenience and safety.

Several drainage and collection devices exist that attempt to combat the various problems encountered, but none do so with the utility and configuration that is demanded by mechanics, technicians, and other maintenance professionals. It is desired to have a fluid drainage and collection unit that is capable of allowing a user to drain and collect fluids from underneath a vehicle that exhibits suitable maneuverability, even for unit used for large vehicles that house larger quantities of fluids. It is further desired for that unit to satisfactorily contain collected fluids while in motion in a manner that minimizes splatter and spillage. The unit should be equipped with a system to adequately protect the user from coming into physical contact with any draining fluid, and to protect the user from being scolded in situations where the fluid is hot. Another desirable feature is for the unit to be provided with a disposing feature to expel collected fluid into other containers suitable for recycling or further disposal of such fluid.

U.S. Pat. No. 4,274,645 shows a portable oil drain collection tank for use in an automobile service station. The device is provided with a thirty-gallon tank mounted on a portable cart, and includes a drain valve and a screen covered funnel extending telescopically.

U.S. Pat. No. 4,485,853 shows a portable oil draining and collection device. The device is equipped with a funneling pan leading to a bladder that is connected to a collection pan. The user lifts and holds the device with one (1) hand to position it under the drain plug of an oil pan. The user then inserts the other hand through the collection pan via the bladder to engage and remove the drain plug, allowing oil to drain from the oil pan and be directed by the bladder to the collection pan. The hand used to loosen the drain plug is encased within the bladder to prevent oil from contacting the hand.

U.S. Pat. No. 4,638,841 shows a fluid collection tank for automobiles that is equipped with a value system to utilize an air compressor to expel the fluid from the tank in order to empty the tank.

U.S. Pat. No. 5,121,776 shows an oil drainage and collection bag equipped with a funnel pan, a mounting ring for receiving a drain plug, and a glove bag pouch to receive a user's hand. The glove bag pouch permits the user to insert a hand and remove a drain plug while keeping the hand encased within the bag structure to prevent oil from contacting the hand.

U.S. Pat. No. 5,320,145 shows an oil drainage and collection bucket with an opening located at a bottom portion thereof. A detachable and replaceable glove is secured to the opening. A user lifts and positions the bucket with one (1) hand, and inserts another hand into the glove to remove a drain plug. The glove allows the user to drain oil without having the oil come into physical contact the user's hand.

U.S. Pat. No. 5,062,500 shows a cart for in situ collection, filtration, and recycling of fluids that is equipped with a baffle system to reduce splashing and turbulence of the collected fluids.

U.S. Pat. No. 5,803,140 shows an oil drain collection apparatus equipped with a magnetic retention means to secure the collection funnel to a surface of an oil pan of a vehicle.

The cited patents exhibit some desired features of the present invention but none do so in one embodiment and none do so with the utility and configuration of the present invention. The present invention is wieldy and maneuverable, but has the capacity to be used for larger vehicles. None of the cited patents exhibit this feature. The present invention protects the user from physical contact and from heat due to the elevated temperatures of the fluids contained within vehicles. None of the cited patents claim to protect from scolding. The present invention is self-containing and is designed to attenuate splashing and turbulence of draining and collected fluids.

SUMMARY OF THE INVENTION

The present invention relates to a fluid removing apparatus and system for trucks. The device comprises a mobile cart with expandable sidewalls, wheels attached to an undercarriage portion with a telescoping guide system to adjust the width of the wheel carriage, a bottom tray exhibiting a downward slope, a fluid receiving chamber, a removable open-mesh screen panel, a plurality of handles, an air pumping system, and at least one (1) glove port.

The fluid receiving chamber further comprises a system of baffle plates with through-holes to serve as a splash reducing mechanism for fluids entering the fluid receiving chamber. The baffle plates also serve to reduce turbulence of collected fluid while the cart is maneuvered. The expandable sidewalls further comprise an inflatable structure attached to a perimeter rim portion of the cart. The air pumping system is used to inflate and deflate the inflatable structure. The inflatable structure comprises of a plurality of contoured air bladders that expand the fluid receiving chamber upwards when inflated, and retracts the fluid receiving chamber downwards when deflated. The inflatable structure is fastened to a rim portion in a fluid-tight manner so as to contain fluids within the fluid receiving chamber during drainage. At least one (1) glove port, comprising of heat-resistant and leak-proof material, is formed into the bladder structure, and is designed to conform to, and receive, a user's hand and arm. The glove port affords a user the ability to engage and remove/attach a drain plug while providing protection to a user's hand and arm. Protection is provided by obviating physical contact with the draining fluid and insulating the hand and arm from hot fluids.

A beneficial feature of the device is that it is equipped with an integral shelving system located near the bottom tray, with at least one (1) access opening, to store various supplies.

Another beneficial feature is the device is that it is provided with a plumbing system and pumping means for collection, drainage, and expulsion of collected fluids into and out of the system.

A user adjusts the wheel base of the apparatus to a desire width. A user employs the handles and wheels to move and position the apparatus so that it aligns underneath drainable portions of a motor vehicle. The sidewall structure is then expanded to a desired height by inflating the air bladders with the air pump until an upper edge portion substantially encompasses the drainable portion of the motor vehicle. The abutment formed benefits the user by creating an encompassing splash-proof structure around the drainable portion of the motor vehicle. A user inserts and extends at least one (1) arm and hand through the glove port to engage and remove a drain plug, or other draining device, permitting fluid to drain into the fluid receiving chamber. The user's arm and hand are again inserted through the glove port to replace the drain plug, or similar device. The bladder and glove port coupled with the encompassing splash-proof structure provides a non-contact means of draining fluids from the vehicle. Fluid that is drained is directed through the screen filters before engaging the bottom tray. The downward slope of the tray further directs the fluid into a final collection cavity. The sidewall structure is then deflated using a vent valve. The apparatus is moved out from underneath the vehicle and positioned next to an external fluid disposal vessel. The baffle structure benefits the user by obviating splashing and turbulence while the apparatus is transported. The fluid contained within the apparatus is then pumped from the fluid receiving chamber into the external fluid disposal vessel.

Being able to conveniently drain and dispose of fluids contained within vehicle motors in a safe and environmentally sound manner is essential. This should include methods to obviate environmental contamination due to splashing and spilling. Providing a means to drain and dispose of fluids without physical contact with the fluids, and with reduced risk of being scalded by hot fluids is important while performing such tasks.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2b is a section view of a sidewall structure portion 21 of the fluid drain cart 10 taken along section line A-A (see FIG. 2a), according to a preferred embodiment of the present invention; and, FIG. 3 is a section view of the fluid drain cart 10 taken along section line B-B (see FIG. 2), according to a preferred embodiment of the present invention.

Figure 1:
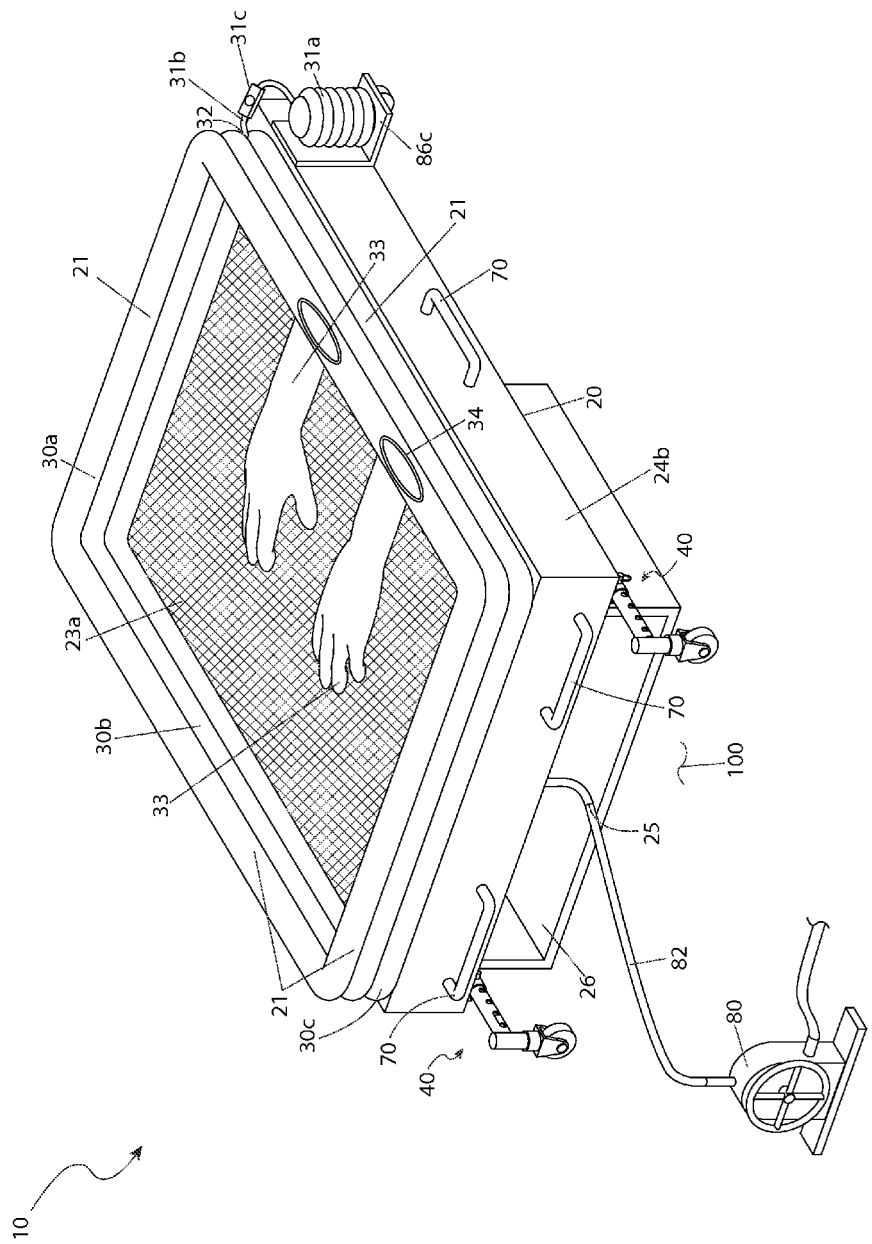
FIG. 1 is a perspective view of a fluid drain cart 10 depicting use along a floor surface 100, according to a preferred embodiment of the present invention.

DESCRIPTIVE KEY 10 fluid drain cart
15 drain valve
20 cart
21 sidewall structure
22 fluid receiving chamber
23a screen panel
23b ledge feature
24a bottom panel
24b side panel
24c rim
25 drain
26 shelf
29 baffle plate
30a first air bladder
30b second air bladder
30c third air bladder
31a air pump
31b air line
31c vent valve
32 inlet connector
33 glove port
34 arm opening
40 wheel assembly
41 wheel support
42 wheel
44 outer guide
46 inner guide
48 aperture
50 pin
70 handle
80 hydraulic pump
82 hydraulic hose
84 fastening means
86 bracket
100 ground surface
110 grease pit
115 fluid
200 vehicle
210 oil pan

DETAILED DESCRIPTION OF THE PREFERRED EMBODIMENT

Figure 2A:
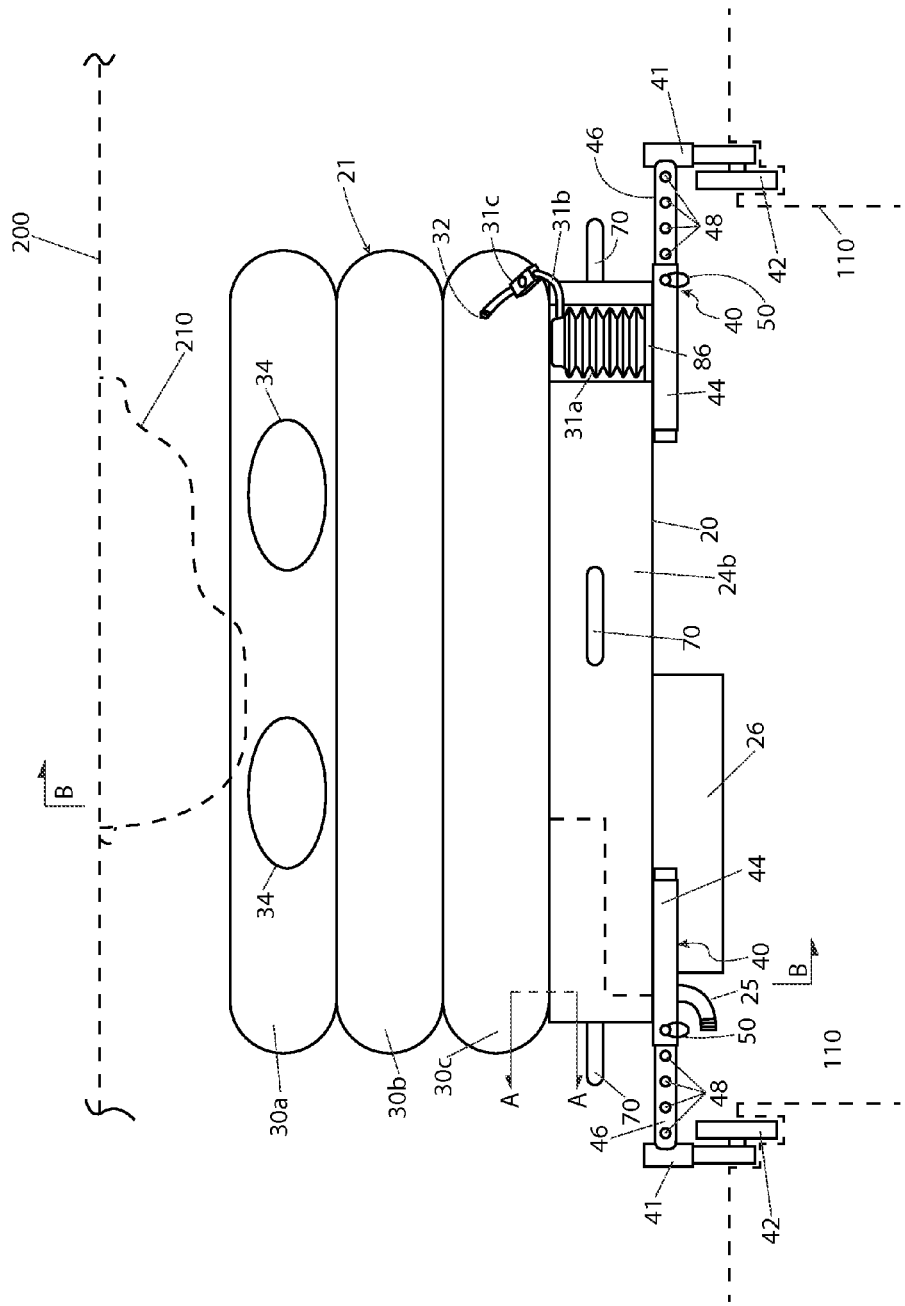
FIG. 2a is a side view of the fluid drain cart 10 depicting use within a grease pit 110, according to a preferred embodiment of the present invention.
Figure 3:
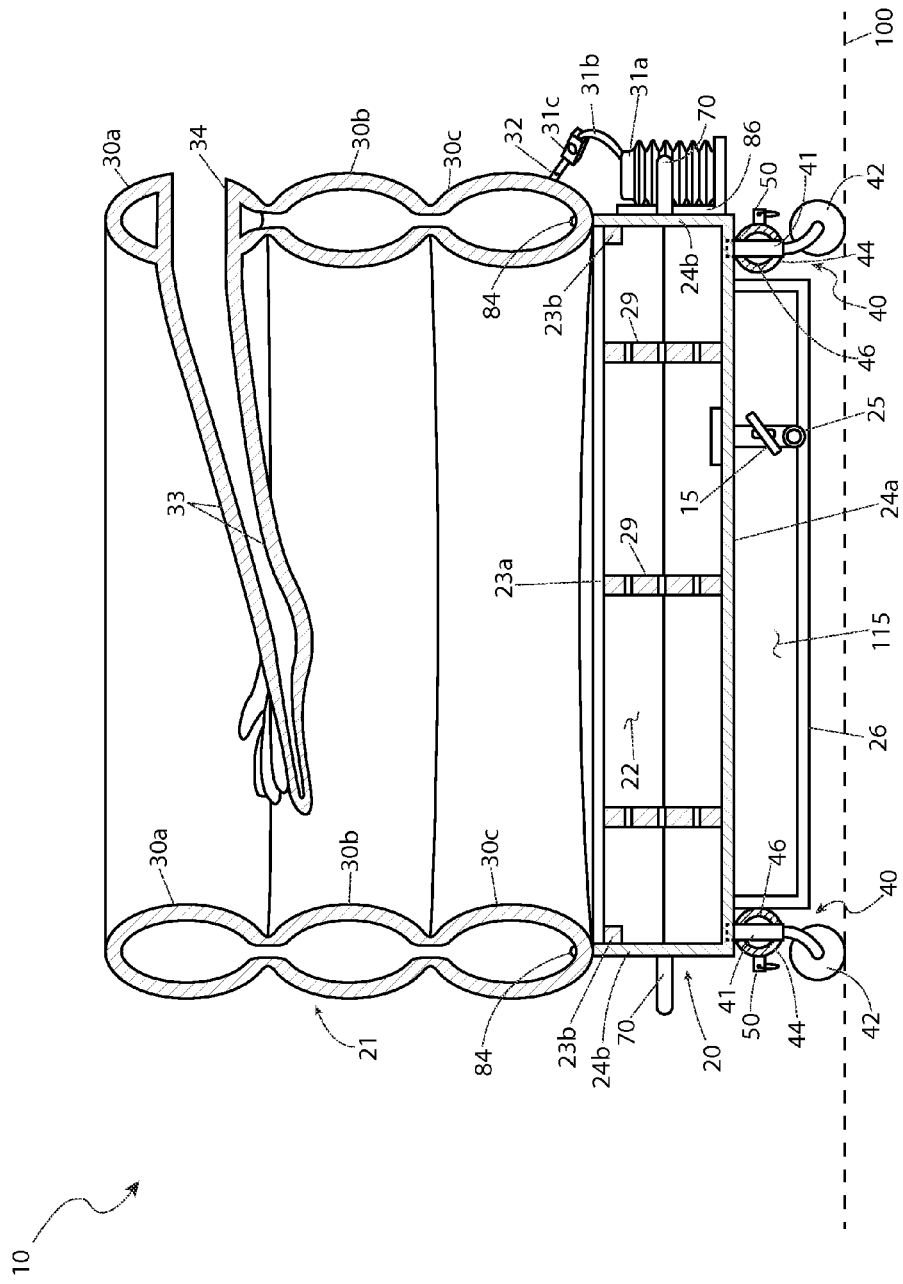

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

In accordance with the invention, the present disclosure will be made to certain embodiments, examples of which are illustrated in the accompanying drawings. Referring now to FIGS. 1 through 3, which depict a fluid drain cart (herein described as an "apparatus") 10, suited for collecting draining fluids 115 from a motor vehicle 200 where like reference numerals represent similar or like parts.

Referring now to FIGS. 1, 2a and 3, perspective, side, and section views of the apparatus 10, according to a preferred embodiment of the present invention, are disclosed. The apparatus 10 comprises a mobile cart 20 having an expandable sidewall structure 21. The cart 20 includes a bottom panel 24a, four (4) side panels 24b extending upwardly from the bottom panel 24a, and an open top portion defining a fluid receiving chamber 22. The cart 20 is preferably fabricated from a durable and rust resistant material, such as polycarbonate, polyvinyl chloride (PVC), acrylonitrile butadiene styrene (ABS), stainless steel, or equivalent material. The open top is covered by an open-mesh screen panel 23a. The screen panel 23a is removable and is supported by a ledge feature 23b which is integral to, and protrudes from an inner surface of the side panels 24b in an inward direction. The screen panel 23a may be removed for cleaning. The screen panel 23a is preferably fabricated from a durable material similar to the cart 20 and comprising a mesh material having openings suitably sized to strain foreign particles or other debris from vehicle fluids 115 which are drained into the fluid receiving chamber 22.

The cart 20 also includes a freely rotatable wheel 42, preferably a swiveling caster type, located near each corner region allowing movement and positioning of the apparatus 10 under a vehicle 200. The wheels 42 are positioned and supported by a wheel support 41 portion of respective wheel assemblies 40 adjustably mounted to the underside of the bottom panel portion 24a of the cart 20 via telescoping outer guide 44 and inner guide 46 members. The apparatus 10 may be positioned along a floor surface 100 as seen in FIG. 1, as well as within side channel portions of a conventional grease pit 110 as seen in FIG. 2, via the guide members 44, 46 which allow a spacing between pairs of wheels 42 to be selectively adjustable allowing said wheels 42 to roll within grease pits having various widths. Each wheel 42 is integral to a respective inner guide portion 46, thereby being positioned by extending or inserting the inner guide 46 within the outer guide 44. Said outer guide 44 and inner guide 46 members are secured with respect to each other by insertion of a pin 50 through a plurality of apertures 48 being formed along side surfaces of the guides 44, 46. The outer guide 44 is rigidly affixed to the bottom panel 24a being welded, integrally-molded, or other strong method of attachment.

The bottom panel 24a of the cart 20 is provided with a generally downward slope from front to rear so as to direct drained fluids 115 toward a drain 25 being disposed through the bottom panel 24a at the rear of the cart 20. The slope of the bottom panel 24a provides for better drainage through the drain 25 of the fluids 115 collected within the fluid receiving chamber 22. In a preferred embodiment, the drain 25 includes plumbing portions such as a valve 15 and an elbow, allowing conventional plumbing connection to a hydraulic pump portion 80 of the apparatus 10 using a joining section of hydraulic hose 82. The drain 25 and hydraulic pump 80 provide containment or allow flow of the fluids 115 from the fluid receiving chamber 22 to an existing fluid collection receptacle. Said hydraulic pump 80 is envisioned to comprise a commercially-available unit, preferably a hand-crank-type common in the industry, and supported by a bracket 86. The hydraulic pump 80 provides proper disposal of the contained fluids 115. However, it is understood that said hydraulic pump 80 may comprise any suitable manual or electrically actuated pump with equal benefit, and as such should not be interpreted as a limiting factor of the apparatus 10.

The cart 20 comprises an integral shelf portion 26 which provides a means to store various supplies and accessories such as, but not limited to: the hydraulic pump 80, the hydraulic hose 82, any associated connectors and couplings, and other associated items within the shelf 26, being affixed to an underside surface of the bottom panel 24a. The shelf 26 has at least one (1) open end portion facing the rear end of the cart 20.

The cart 20 also includes a plurality of handles 70 which provide a means to pick up and carry, or re-position the apparatus 10. The handles 70 are preferably rigid "C"-shaped members being welded or otherwise rigidly affixed to the cart 20 being arranged singularly or in pairs along each of the side panels 24b.

As best seen in FIG. 3 the apparatus 10 also includes a plurality of equally-spaced baffle plates 29 to reduce splashing of the contained fluids 115 within the fluid receiving chamber 22 when the apparatus 10 is moved or otherwise repositioned. The baffle plates 29 extend horizontally between opposing side panels 24b in a perpendicular manner being welded or otherwise affixed to said side panels 24b and the bottom panel 24a within the fluid receiving chamber 22. The baffle plates 29 each include a plurality of through holes. It can be appreciated that the number and arrangement of the baffle plates 29 can vary depending upon an overall size of the apparatus 10. In the illustrated embodiment the baffle plates 29 extend from front to rear in a parallel manner, however, in other embodiments the baffle plates 29 can include an additional set of perpendicular plates forming a grid-like pattern.

The expandable sidewall structure 21 forms an inflatable structure mounted to the perimeter rim portion 24c of the cart 20 forming a vertically adjustable rectangular shape (also see FIG. 2b). The sidewall structure 21 can be made of any suitable pliable and inflatable material, such as rubber, latex, polyvinyl chloride/vinyl, or equivalent material. The sidewall structure 21 comprises a plurality of contoured air bladders 30a, 30b, 30c arranged in a vertical manner, with each bladder 30a, 30b, 30c in fluid communication with an adjacent bladder 30a, 30b, 30c such that the bladders 30a, 30b, 30c inflate concurrently as seen in FIG. 3. The plurality of air bladders 30a, 30b, 30c collapses when the sidewall structure 21 is deflated to form a low profile shape. When inflated, the sidewall structure 21 expands upward approaching a superjacent oil pan portion 210 of the vehicle 200. In the illustrated embodiment, the apparatus 10 includes three (3) levels of air bladders 30a, 30b, 30c; however, it can be appreciated that the sidewall structure 21 can include any number of bladder layers depending upon the maximum expanded height which is needed. The selectable expanding nature of the sidewall structure 21 allows compliant closure of a gap formed between the oil pan 210 and the sidewall structure 21 while fluid 115 is being drained thus reducing the likelihood of spilling fluids 115.

The air bladder portions 30a, 30b, 30c of the sidewall structure 21 are inflated by a pneumatically connected on-board air pump 31a. The air pump 31a preferably comprises a bellows-type hand or foot actuated unit similar to those used for inflating small inflatable items. However, it can be appreciated that the air pump 31a may comprise other types such as a soft PVC pump, a double actuating cylinder pump, an electric air pump, or the like with equal benefit, and as such should not be interpreted as a limiting factor of the apparatus 10. A flexible rubber or plastic air line 31b having an in-line vent valve portion 31c is connected between an air outlet port portion of the air pump 31a and an inlet connector portion 32 of the sidewall structure 21, preferably located upon the third air bladder 30c. In the illustrated embodiment the air pump 31a comprises an integral "L"-shaped support bracket 86 being welded, or otherwise permanently affixed to the cart 20.

At least one (1) glove port 33 is integrated into a bladder portion 30 of the sidewall structure 21 for receiving a user's hand providing protective removal and attachment of a drain plug portion of the oil pan 210 or other equipment which needs to be removed during draining the fluids 115 from the vehicle 200. In the illustrated embodiment two (2) gloves ports 33 are shown at a distal end for accommodating a left and a right hand of the user; however, it can be appreciated that a single glove port 33 may be used to perform particular draining tasks with equal benefit. In certain embodiments a single glove port 33 can be adapted to fit either the right hand or the left hand of the user by integrating dual-thumb portions. The glove port 33 is made from a heat resistant and leak-proof material for protecting the user's hands and arms from any hot fluids 115 that may violently escape from the vehicle 200 such as when a drain plug or an oil filter is removed. The glove port 33 includes hand covering and arm covering portions providing a snug fit around the user's hand and arm. A proximal end portion of the glove port 33 is permanently affixed in a sealed manner to the sidewall structure 21 to the first air bladder 30a via an ovular or circular-shaped arm opening 34. The sealed perimeter portion of the arm opening 34 prevents air from escaping from the bladders 30a, 30b, 30c. The arm opening 34 allows the user's arm to pass entirely through the sidewall structure 21 to work within the interior of the apparatus 10.

Referring now to FIG. 2b, a section view of a sidewall structure portion 21 of the apparatus 10 taken along section line A-A (see FIG. 2a), according to a preferred embodiment of the present invention, is disclosed. The third air bladder portion 30c of the sidewall structure 21 is to be fastened to a rim portion 24c of the cart 20 in a fluid-tight manner so as to avoid any leakage of the fluids 115 during drainage, while also maintaining the air-tight nature of the sidewall structure 21, thereby assuring prolonged inflation of the air bladders 30a, 30b, 30c. The rim 24c is envisioned to comprise a horizontally formed or molded appendage all around the side panels 24b which provides a surface onto which the third air bladder 30c may be securely fastened using a plurality of fastening means 84 such as rivets or the like, resulting in a liquid-tight seal.

The materials required to produce the apparatus 10 are all readily available and well known to manufacturers of goods of this type. The cart 20 can be made of sheet steel in a stamping and welding process. After manufacture, a suitable protective finish such as paint or plating would be applied to prevent corrosion. The rubberized sidewall structure 21 and integral glove ports 33 would be made of heavy duty rubber in an injection molding process. This process would require the design and use of custom molds. The remaining components of the apparatus 10, namely the casters 24, handles 70, fasteners 84, and the like, would best be procured from wholesalers and manufacturers that deal in goods of that nature and assembled at a final location. The relatively simple design of the apparatus 10 and the material of construction make is a cost-effective design due to the relatively low material and labor costs involved. Final production of the apparatus 10 will be performed by manufacturing workers of average skill.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 2a.

The method of utilizing the apparatus 10 can be achieved by performing the following steps; using the handles 70 to move and position the apparatus 10, upon the wheel assemblies 40, underneath drainable portions of a motor vehicle 200 such as an oil pan 210; expanding the sidewall structure 21 to a desired height by inflating the air bladders 30a, 30b, 30c by repeatedly pressing upon the air pump 31a with a hand or foot; inflating the sidewall structure 21 until an upper edge portion partially or completely encompasses a bottom of a vehicle oil pan 210 or other drainable vessel of the vehicle 200; inserting and extending at least one (1) arm and hand of the user through the arm opening portion 34 of the glove port 33; using the inserted hand to engage and remove a pan drain plug or other draining device; allowing a period of time for the fluids 115 to drain completely into the fluid receiving chamber 22; replacing the pan drain plug or similar device using one's hand within the glove port 33; deflating the sidewall structure 21 using the vent valve 31c upon the air line 31b; utilizing the wheel assemblies 40 to move the apparatus 10 to a location out from underneath the vehicle 200; pumping the fluid 115 from the fluid receiving chamber 22 into an existing fluid disposal vessel by plumbingly connecting the hydraulic pump 80 and hydraulic hose 82 to the drain portion 25 of the cart 20; opening a valve portion 15 of the drain 25; manually cranking the hydraulic pump 25 until all of the fluid 115 has been removed from the receiving chamber 22; repeating the above steps for additional fluid draining tasks as needed; and, benefiting from a splash-proof and non-contact means of draining fluids 115 from a vehicle 200 afforded a user of the present invention 10.

The sidewall structure 21 prevents the risk of spillage or splashing of hot fluids 115 as they escape the oil pan 210 upon a user. The glove ports 33 protect the user's hands and arms from being covered in fluid 115 or burned due to hot fluids 115. Portions of the vehicle 200 such as an oil filter or fuel filter may also be removed in like manner.

Once the used fluid 115 is drained from the vehicle oil pan 210, the drain plug portion of the oil pan 210 can be connected and tightened via the glove ports 33. The apparatus 10 can then be rolled away for disposal of the fluids 115 contained within the oil receiving chamber 22. The fluid 115 can be drained through the use of the connected hydraulic hose 82 and hydraulic pump 80.

Another embodiment of the apparatus 10 comprises a pair of glove ports 33 and respective arm openings 34, thereby providing a means for a user to use both arms and hands to perform the above described fluid draining tasks. Additionally, it can be appreciated that the previous operational steps can be performed in various alternate orders, and as such should not be viewed as a limiting factor.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A cart, comprising: a cart frame, comprising a bottom panel, four side panels each extending upwardly from said bottom panel, and an open top portion in fluid communication with a receiving chamber; at least one handle affixed to one of said side panels; a shelf portion depending below said bottom panel, having at least one open end; a drain located at a bottom of an expandable structure in fluid communication with said receiving chamber; a screen panel removably disposed within said cart frame above said receiving chamber; said expandable structure mounted and sealed to an upper perimeter rim of each of said sidewalls, further comprising an inner chamber in fluid communication with said receiving chamber; at least one glove port integrated into said expandable structure providing access to a glove affixed and sealed to said glove port and extending inwardly into said inner chamber; wherein said expandable structure is adapted to be in fluid communication with an inflating mechanism; wherein said expandable structure is expandable to a desired vertical height above said cart frame; wherein said receiving chamber is adapted to receive drained fluids from a vehicle; and, wherein said screen panel strains debris from said drained fluids.

2. The cart of claim 1, wherein said bottom panel comprises a downward slope from a first end to a second end, such that said drain is located at a central point of said second end, such that said drained fluids are directed toward said drain.

3. The cart of claim 2, wherein said perimeter rim of said side panels further comprises a horizontal appendage inwardly extending therefrom.

4. The cart of claim 2, wherein said drain is adapted to removably connect to and be in fluid communication with a hydraulic pump.

5. The cart of claim 2, wherein said screen panel resides on a ledge feature circumscribing an inner side of each of said sidewalls.

6. The cart of claim 2, further comprising an adjustable caster wheel assembly located at each corner of a bottom surface of said bottom panel.

7. The cart of claim 6, wherein said wheel assembly further comprises:
a wheel support having an inner guide telescopically movable relative to an outer guide mounted to said bottom panel;
a freely rotatable wheel mounted to said inner guide; and,
a pin securing a desired position of said inner guide within said outer guide.

8. The cart of claim 2, further comprising a plurality of equally-spaced baffle plates each horizontally spanning between opposing side panels within said receiving chamber, each said baffle plate further comprises a plurality of through holes.

9. The cart of claim 2, wherein said expandable structure further comprises a plurality of contoured air bladders arranged in a vertical manner, with each bladder in fluid communication with an adjacent bladder;
wherein said plurality of air bladders are adapted to be inflated concurrently by said inflating mechanism.

10. A cart, comprising: a cart frame, comprising a bottom panel, four side panels each extending upwardly from said bottom panel, and an open top portion in fluid communication with a receiving chamber; at least one handle affixed to one of said side panels; a shelf portion depending below said bottom panel, having at least one open end; a drain located at a bottom of an expandable structure in fluid communication with said receiving chamber; a screen panel removably disposed within said cart frame above said receiving chamber; said expandable structure mounted and sealed to an upper perimeter rim of each of said sidewalls, further comprising an inner chamber in fluid communication with said receiving chamber; an inflating mechanism in fluid communication with said expandable structure; at least one glove port integrated into said expandable structure providing access to a glove affixed and sealed to said glove port and extending inwardly into said inner chamber; wherein said inflating mechanism inflates said expandable structure to a desired vertical height above said cart frame; wherein said receiving chamber is adapted to receive drained fluids from a vehicle; and, wherein said screen panel strains debris from said drained fluids.

11. The cart of claim 10, wherein said bottom panel comprises a downward slope from a first end to a second end such that said drain is located at a central point of said second end, such that said drained fluids are directed toward said drain.

12. The cart of claim 11, wherein said perimeter rim of said side panels further comprises a horizontal appendage inwardly extending therefrom.

13. The cart of claim 11, wherein said drain is adapted to removably connect to and be in fluid communication with a hydraulic pump.

14. The cart of claim 11, wherein said screen panel resides on a ledge feature circumscribing an inner side of each of said sidewalls.

15. The cart of claim 11, further comprising an adjustable caster wheel assembly located at each corner of a bottom surface of said bottom panel.

16. The cart of claim 15, wherein said wheel assembly further comprises:
a wheel support having an inner guide telescopically movable relative to an outer guide mounted to said bottom panel;
a freely rotatable wheel mounted to said inner guide; and,
a pin securing a desired position of said inner guide within said outer guide.

17. The cart of claim 11, further comprising a plurality of equally-spaced baffle plates each horizontally spanning between opposing side panels within said receiving chamber, each said baffle plate further comprises a plurality of through holes.

18. The cart of claim 11, wherein said expandable structure further comprises a plurality of contoured air bladders arranged in a vertical manner, with each bladder in fluid communication with an adjacent bladder;
wherein said plurality of air bladders are adapted to be inflated concurrently by said inflating mechanism.

19. The cart of claim 11, wherein said inflating mechanism further comprises:
an air pump; and,
flexible rubber tubing with an in-line vent valve portion, further comprising a first end in fluid communication with an outlet of said air pump and a second end in fluid communication with said expandable structure.

20. The cart of claim 19, wherein said air pump is supported on a bracket affixed to said cart frame.

* * * * *